July 23, 1968
B. F. LAMBERT
3,393,998
METHOD OF SELECTIVELY REMOVING SOLDER FROM A
VEHICULAR RADIATOR TO PRODUCE AN
ALLOY SPECIFICATION PRODUCT
Filed June 21, 1965
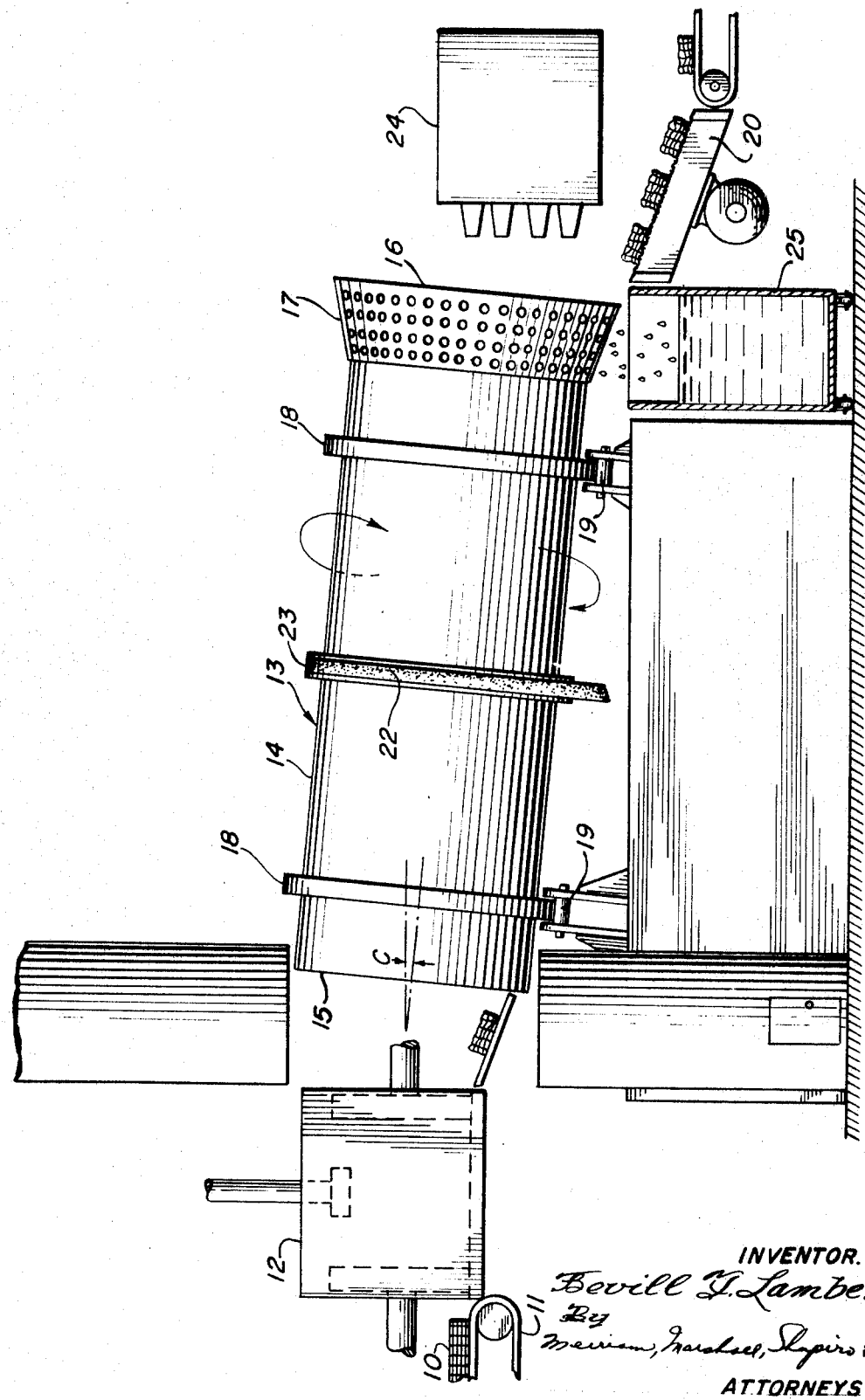
INVENTOR.
Bevill F. Lambert
By
Merriam, Marshall, Shapiro & Klose
ATTORNEYS.

United States Patent Office 3,393,998
Patented July 23, 1968

3,393,998
METHOD OF SELECTIVELY REMOVING SOLDER FROM A VEHICULAR RADIATOR TO PRODUCE AN ALLOY SPECIFICATION PRODUCT
Bevill F. Lambert, 116 W. 37th St., Erie, Pa. 16508
Filed June 21, 1965, Ser. No. 465,656
8 Claims. (Cl. 75—63)

This invention relates generally to the processing of scrap materials to achieve a desired alloy specification, and more particularly relates to the selective sweating of a definite portion of tin-lead solder from scrap vehicular radiators containing brass and/or copper components connected with solder, to directly produce a copper-base casting alloy having a particular specification.

In the casting of valves, fittings and the like by brass foundries, it is required, in many instances, that the alloys employed for casting purposes correspond to a particular specification. In most instances, the alloy to be cast must correspond to an ASTM specification, such as a specification designated B–30–45T, which is classified as a leaded semi-red brass having numerical designation 5A. This alloy is known in the trade as "valve metal" and is one of the largest-selling copper-base casting alloys. Plumbing supplies and low pressure valves are cast from and alloy of this specification. The composition, based on a percentage by weight basis, consists essentially of copper 78–82%, tin 2.5–3.5%, lead 6.25–7.75% and zinc 7.50%–10%.

In making castings having this specification, the foundryman will generally melt ingots of one or more different compositions and which have been provided by smelting companies who have used copper-bearing scrap materials including vehicular radiators, in preparing the compositions. These scrap materials are melted, refined and then cast into ingots by the smelting company.

In preparation most copper-base casting alloys, only about half of the raw materials employed by the smelting company can be radiators due to the excessive lead content (e.g. 12%) arising from the solder in the radiators. The remainder of the raw materials must be more expensive, low-lead materials. Because the amount of radiators which can be used is limited, the cost of the ingots is increased.

Moreover, when a smelting company makes ingots, because of the melting and refining operations, there is generally a loss of raw materials either as slag or up the stack of the refining furnace; and these losses can amount to a substantial sum over a period of time, thereby affecting the over-all production cost in making ingots.

The cost incurred by the foundry in purchasing the necessary supply of ingots is, of course, quite expensive and represents a substantial percentage of the over-all cost for casting the desired product. In order for foundries to minimize these costs, while at the same time permitting them to utilize materials which meet an ASTM specification required for a particular application, I have invented a new and novel process whereby scrap radiators or the like will, following processing, meet a particular ASTM specification without undergoing conventional melting, refining and ingot-casting operations.

Moreover, in my process, because the solder is removed without subjecting the entire radiator to melting and refining operations, the loss of material arising in conventional procedures is eliminated.

In the instant invention, I initially briquette scrap radiators after which the briquetted radiators are tumbled in a heated, pitched, rotating tubular apparatus whereby a desired amount of solder is selectively sweated from the briquetted radiator. The melted solder rolls out of the tube machine into a slag buggy which collects the excess solder for resale or other purposes. The briquetted radiators upon removal from the tube can be agitated, if desired, on a conventional vibrating screen device where additional solder can be removed from the briquetted product. Subsequently, the briquetted product with the excess solder removed can then be used, without additional materials, for making castings calling for a particular ASTM specification.

An example of my novel process can be demonstrated as follows. A scrap radiator contains approximately 74% copper, 4% tin, 12% lead, the balance of the material being zinc. Thus, the total solder content is 16%. In order to arrive at the ASTM specification B–30–45T specified above, about 40% of the solder must be selectively sweated out of the radiator. This figure amounts to about 6.4% of the total radiator content. In utilizing my novel process, the radiator, following briquetting and selective solder sweating, conforms to a product which, based on a percent by weight basis, has a material composition of approximately:

|  | Percent |
|---|---|
| Copper (74/(100—6.4)) | 79 |
| Tin (.60×4%) | 2.4 |
| Lead (.60×12%) | 7.2 |
| Zinc | Balance |

This analysis reveals a product which satisfies ASTM specification B–30–45T.

With my invention, foundries can now undertake to install the necessary briquetting and tumbling machines to process scrap radiators themselves, thereby obviating the need for purchasing ingots from smelting companies; for once a radiator has been processed, it can be stored or utilized immediately by the foundry for casting purposes.

The advantages to the foundry are numerous. They are now in a position whereby they can process the scrap radiators themselves, thereby reducing the initial material costs which they presently pay to ingot suppliers. Moreover, the excess solder removed from the radiators can be sold to defray operating expenses incurred in producing the sweated, briquetted radiators. Further, there is an elimination of the melt loss of material, which occurs in the conventional production of ingots.

The invention will be better understood from the following detailed description thereof, taken in conjunction with the accompanying drawing, which schematically shows my new and novel process for securing a sweated, briquetted radiator product which satisfies a particular material specification.

Referring to the drawing, scrap radiator 10 is carried by conveyor 11 to a conventional briquetting machine 12. Prior to its arrival at briquetter 12, radiator 10 can, if necessary, be passed through a magnetizing station (not shown) wherein any radiator having undesirable iron parts attached thereto can be removed for further handling before being processed.

In briquetter 12, radiator 10 is substantially compressed in size; however, it is left sufficiently porous enough in order that solder contained therein, upon melting, can run out of the radiator. Following, the briquetted radiator is conveyed to rotating, tumbling apparatus 13.

Tumbler 13 comprises a drum-like member 14 open at inlet end 15 and flared out at the remaining outlet or discharge end 16 thereby forming perforated conical-shaped section 17. The drum or tube member 14 is steel fabricated with the inner drum wall lined with fire brick. Preferably, the drum is about 20 feet long and has an outer diameter of about 48 inches. Tires 18, which are attached to drum member 14, are supported for rotation on trunnion bearings 19.

The drive system for tumbler apparatus 14 is accomplished by a drive means which actuates belt 22 located on pulley 23 to rotate tumbler 13. Other drive arrangements can be utilized. For example, a sprocket drive arrangement or other suitable means could readily be employed to rotate tumbler 13.

Briquetted radiators 10 are tumbled as they travel along the length of apparatus 13. In addition, the radiators, in the course of tumbling, are heated by heat generated by gas or oil-blower means 24. As the radiators 10 are heated and tumbled, the solder in the radiator melts and flows out of the radiator. Because the radiators in tumbler 13 are in briquette form, the individual brass and copper parts constituting each radiator are maintained together when the solder melts. Further, some of the solder is retained within the briquetted radiators thereby allowing the end product to have the requisite tin and lead content.

In order to assure an end product having the desired tin and lead content, it is essential that the heat supplied to the tumbler device, the rate of rotation of the tumbler and the pitch of the tumbler device measured from a horizontal plane, be controlled. It has been determined that tumbler 13 should be rotated in the range of about 2–20 r.p.m. with a preferable speed being about 6 r.p.m. The tumbler should slope downwardly, away from the inlet end of an angle C in the range of about 3–30° and preferably about 10°. The average temperature throughout the length of tumbler 13 should be maintained in the range of about 200° on the charge end 15 to 1100° on the discharge end 16 and preferably the average briquette temperature should be about 850° F.

As the briquetted products are tumbled out of the tumbler, they can be dropped, if desired, onto vibrating screen 20 for the purpose of further eliminating the solder from the briquetted radiator after which the finished product can be transported by conveyor 21 or other suitable means to a place of storage or to a location where the briquetted product which satisfies a particular specification can be utilized.

Slag buggy 25 is positioned below the perforated section 17 in order to catch solder drippings which emanate from the heated briquetted radiators 10 during their stay in tumbler 13.

The foregoing detailed description has been given for clearness of understanding only, and no unnecessary limitations should be understood therefrom, as modifications will be obvious to those skilled in the art.

What is claimed is:
1. The method of selectively sweating solder from a vehicular radiator, containing brass and copper components connected with solder, to achieve a particular alloy specification, said method comprising the steps of:
   briquetting said radiator; and,
   heating and tumbling said radiator to melt and remove excess solder from said radiator.
2. The method of claim 1 further including the step of vibrating said briquetted radiator after said heating and tumbling.
3. The method of selectively sweating solder from a vehicular radiator, containing brass and copper components connected with solder, to achieve a particular material specification in accordance with the steps of:
   briquetting said radiator; and,
   simultaneously heating and tumbling said raidator in a rotary furnace;
   said heating step being performed at a furnace temperature in the range of about 200–1100° F. in order that a selected amount of solder in said radiator is removed.
4. The method of selectively sweating excess solder from a vehicular radiator, containing brass and copper components connected with solder, to achieve a particular material specification in accordance with the steps of:
   briquetting said radiator;
   simultaneously tumbling said radiator in a tumbling apparatus rotated at a speed of about 2–20 r.p.m. and sloped downwardly from its inlet end at an angle of about 3–30°; and,
   heating said radiator in said tumbler apparatus at an apparatus temperature in the range of about 200–1100° F. whereby solder is selectively sweated from said radiator.
5. The method of claim 4 further including the step of removing said briquetted radiator from said tumbler device after said heating and tumbling steps.
6. The method of claim 5 further including the step of vibrating said briquetted radiator following its removal from said tumbler apparatus.
7. The method of selectively sweating excess solder from a vehicular radiator, containing brass and copper components connected with solder, to achieve a particular material specification in accordance with the steps of:
   briquetting said radiator;
   simultaneously tumbling said radiator in a tumbling apparatus rotated at a speed of about 6 r.p.m. and sloped downwardly from its inlet end at an angle of about 10°; and,
   heating said radiator in said tumbler apparatus to a briquette temperature of about 850° F. whereby solder is selectively sweated from said radiator.
8. The method of selectively sweating excess solder from a vehicular radiator to achieve a material specification whose analysis, based on a percent by weight basis, consists essentially of 79% copper, about 2.4% tin, about 7.2% lead and the balance zinc, in accordance with the steps of:
   briquetting said radiator whose material analysis, based on a percent by weight basis, consists essentially of 74% copper, about 4% tin, about 12% lead and the balance zinc;
   tumbling said radiator in a tumbling apparatus rotating at a speed of about 2–20 r.p.m. and sloped downwardly from its inlet end at an angle of about 3–30°; and,
   heating said radiator while in said tumbling apparatus, with the temperature of said apparatus being in the range of about 200–1100° F., whereby about 40% of said solder is removed from said radiator so that said radiator satisfies said material specification.

References Cited
UNITED STATES PATENTS

| | | | |
|---|---|---|---|
| 1,989,852 | 2/1935 | Eppenstener | 75—63 |
| 1,260,312 | 3/1918 | Brown | 75—63 |
| 2,041,811 | 5/1936 | Betterton et al. | 75—63 |
| 2,154,673 | 4/1939 | Fleck et al. | 75—63 |

HYLAND BIZOT, Primary Examiner.
H. W. TARRING, Assistant Examiner.